(12) United States Patent
Pournaghshband Isfahani et al.

(10) Patent No.: US 11,202,986 B2
(45) Date of Patent: Dec. 21, 2021

(54) PLASTICIZATION-RESISTANT POLYURETHANE MEMBRANE AND PREPARATION METHOD THEREOF

(71) Applicants: Ali Pournaghshband Isfahani, Isfahan (IR); Morteza Sadeghi, Isfahan (IR); Behnam Ghalei, Kyoto (JP); Rouhollah Bagheri, Isfahan (IR)

(72) Inventors: Ali Pournaghshband Isfahani, Isfahan (IR); Morteza Sadeghi, Isfahan (IR); Behnam Ghalei, Kyoto (JP); Rouhollah Bagheri, Isfahan (IR)

( * ) Notice: Subject to any disclaimer, the term of this patent is extended or adjusted under 35 U.S.C. 154(b) by 178 days.

(21) Appl. No.: 16/153,770

(22) Filed: Oct. 7, 2018

(65) Prior Publication Data

US 2019/0039016 A1    Feb. 7, 2019

Related U.S. Application Data

(60) Provisional application No. 62/569,634, filed on Oct. 9, 2017.

(51) Int. Cl.
*B01D 53/22* (2006.01)
*B01D 71/48* (2006.01)
(Continued)

(52) U.S. Cl.
CPC ........... *B01D 53/228* (2013.01); *B01D 71/48* (2013.01); *B01D 71/80* (2013.01); *C08G 18/12* (2013.01); *C08G 18/18* (2013.01); *C08G 18/2018* (2013.01); *C08G 18/2063* (2013.01); *C08G 18/242* (2013.01); *C08G 18/244* (2013.01);
(Continued)

(58) Field of Classification Search
CPC ...... B01D 53/228; B01D 71/54; B01D 71/80; B01D 2323/30; B01D 2325/22; C08G 18/10; C08G 18/12; C08G 18/3203; C08G 18/34; C08G 18/72; C08G 18/73
See application file for complete search history.

(56) References Cited

U.S. PATENT DOCUMENTS 4,115,465 A * 9/1978 Elfert ................ B01D 71/54
                                                  208/308
4,786,657 A * 11/1988 Hammar ............ B01D 71/54
                                                  522/90
(Continued)

FOREIGN PATENT DOCUMENTS

CN         104258744 A    6/2015

OTHER PUBLICATIONS

Matthew J. O'Sickey, Bruce D. Lawrey, Garth L. Wilkes, Structure—Property Relationships of Poly(urethane urea)s with Ultra-low Monol Content Poly(propylene glycol) Soft Segments. I. Influence of Soft Segment Molecular Weight and Hard Segment Content, Journal of Applied Polymer Science, 84 (2002) 229-243.

*Primary Examiner* — Jason M Greene
(74) *Attorney, Agent, or Firm* — Bajwa IP Law Firm; Haris Zaheer Bajaw

(57) ABSTRACT

A plasticization-resistant polyurethane membrane for gas separation and producing method are disclosed. The plasticization-resistant polyurethane membrane may include a soft segment, a hard segment and a chain extender. The soft segment may include a polyol compound and the hard segment may include a diisocyanate. The plasticization-resistant polyurethane membrane may be a cross-linked polyurethane membrane.

6 Claims, 20 Drawing Sheets

(51) Int. Cl.

| | | |
|---|---|---|
| *C08G 18/12* | (2006.01) | |
| *C08G 18/24* | (2006.01) | |
| *C08G 18/20* | (2006.01) | |
| *C08G 18/32* | (2006.01) | |
| *C08G 18/34* | (2006.01) | |
| *C08G 18/72* | (2006.01) | |
| *C08G 18/83* | (2006.01) | |
| *B01D 71/80* | (2006.01) | |
| *C08G 18/73* | (2006.01) | |
| *C08G 18/48* | (2006.01) | |
| *C08G 18/76* | (2006.01) | |
| *C08G 18/18* | (2006.01) | |
| *C08G 18/75* | (2006.01) | |
| *B01D 71/54* | (2006.01) | |
| *B01D 71/52* | (2006.01) | |
| *B01D 69/02* | (2006.01) | |

(52) U.S. Cl.
CPC ....... *C08G 18/246* (2013.01); *C08G 18/3203* (2013.01); *C08G 18/34* (2013.01); *C08G 18/4841* (2013.01); *C08G 18/4845* (2013.01); *C08G 18/72* (2013.01); *C08G 18/73* (2013.01); *C08G 18/755* (2013.01); *C08G 18/758* (2013.01); *C08G 18/7621* (2013.01); *C08G 18/7671* (2013.01); *C08G 18/831* (2013.01); *C08G 18/833* (2013.01); *B01D 69/02* (2013.01); *B01D 71/52* (2013.01); *B01D 71/54* (2013.01); *B01D 2256/10* (2013.01); *B01D 2256/16* (2013.01); *B01D 2256/245* (2013.01); *B01D 2257/504* (2013.01); *B01D 2323/30* (2013.01); *B01D 2325/22* (2013.01)

(56) References Cited

U.S. PATENT DOCUMENTS

| | | | | |
|---|---|---|---|---|
| 5,045,354 | A * | 9/1991 | Feimer | B01D 71/54 |
| | | | | 427/245 |
| 5,075,006 | A * | 12/1991 | Schucker | B01D 71/54 |
| | | | | 210/500.27 |
| 5,219,663 | A * | 6/1993 | Kohno | C08G 18/44 |
| | | | | 252/62.54 |
| 5,290,452 | A * | 3/1994 | Schucker | B01D 61/362 |
| | | | | 210/640 |
| 9,045,582 | B2 | 6/2015 | Liu et al. | |
| 2009/0324692 | A1* | 12/2009 | Tuominen | C08G 18/73 |
| | | | | 424/432 |
| 2018/0065093 | A1 | 3/2018 | Takada et al. | |

* cited by examiner

PLASTICIZATION-RESISTANT POLYURETHANE MEMBRANE AND PREPARATION METHOD THEREOF

CROSS REFERENCE TO RELATED APPLICATION

This application claims priority from U.S. Provisional Patent Application Ser. No. 62/569,634, filed on Oct. 9, 2017, entitled "POLYURETHANE MEMBRANE FOR GAS SEPARATION", which is incorporated by reference herein in its entirety.

TECHNICAL FIELD

The present disclosure generally relates to polyurethane membranes, particularly to a method for improving plasticization-resistant behavior and gas separation performance of a polyurethane membrane based on PPG-b-PEG triblock copolymers and cross-linking agents.

BACKGROUND

Membrane gas separation methods are separation techniques that aid in reducing capital investment and operating cost, while increasing process safety. Moreover, membrane gas separation techniques are attractive due to their small footprint, high-energy efficiency, simplicity, and modular compactness. Membrane gas separation is a pressure-driven process in which the pressure difference between membrane sides acts as a driving force. Based on the material that forms the membranes, the membranes are categorized into metallic, inorganic, and polymeric.

Owing to some superior properties, such as low capital cost, ability to move manufacturing easily toward commercial uses that may be processed into modules, steadfastness at high pressures, low energy consumption, and facile scalability, polymeric membranes are one of the best candidates in the field of membrane technology for use in various gas separation applications (e.g., natural gas processing, landfill gas recovery, separation of olefin/paraffin, air separation, hydrogen recovery, etc.). Among utilized polymers for membrane gas separation technology, polyurethane (PU) membranes have emerged as the most commonly utilized membranes for gas separation because of their good film formation ability and tunable structures. PUs are a set of polymers with extremely extensive flexibility in their structures and properties, which include alternating urethane or urea as a hard segment and polyol (polyether/polyester) as a soft segment.

Plasticization may occur when highly condensable species like $H_2S$, $CO_2$ or hydrocarbon gases absorb into the polymer matrix, causing swelling and loss of polymer chain interactions. This may lead to an intensive increase in the segmental mobility within the polymer membrane, which is accompanied by a rise in the permeability of all components. Typically, this permeability increase may be associated with a drop in selectivity of the polymer membrane to $H_2S$, $CO_2$, or hydrocarbon gases, since larger components may experience a greater increase in permeability than smaller components.

Therefore, there is a need in the art for developing some methods to enhance the plasticization-resistance of PU membranes while maintaining their separation performance.

SUMMARY

This summary is intended to provide an overview of the subject matter of this patent, and is not intended to identify essential elements or key elements of the subject matter, nor is it intended to be used to determine the scope of the claimed implementations. The proper scope of this patent may be ascertained from the claims set forth below in view of the detailed description below and the drawings.

In one general aspect, the present disclosure describes an exemplary plasticization-resistant polyurethane membrane for gas separation. The exemplary plasticization-resistant polyurethane membrane may include a soft segment and a hard segment. In an exemplary embodiment, the soft segment may include a polyol compound, wherein the polyol compound may include a block copolymer of the formula $PEG_a\text{-}PPG_b\text{-}PEG_a$ and the formula $PPG_b\text{-}PEG_a\text{-}PPG_b$, where a and b may include an integer from 3 to 50, the block copolymer may include an average molecular weight of at least 1000. In an exemplary embodiment, the hard segment may include a diisocyanate and a chain extender, wherein the plasticization-resistant polyurethane membrane may include covalent ester cross-links. In an exemplary embodiment, the soft segment may include a polyether and a polyester. The polyether and the polyester may include one or more of poly (tetramethylene ether) glycol, polypropylene glycol, polyethylene glycol, polydimethylsiloxane hydroxyl terminated, and polycaprolactone.

In an exemplary embodiment, the diisocyanate may include one or more of isophorone diisocyanate (IPDI), toluene diisocyanate (TDI), hexamethylene diisocyanate (HDI), dicyclohexylmethane, 4,4'-diisocyanate, methylene diphenyl diisocyanate, diisocyanate-terminated polyester, and diisocyanate-terminate polyether.

In an exemplary embodiment, the chain extender may include a diol and a diamine, wherein the diol including at least one of 1,4-butanediol (BDO), 1,6-hexanediol (HDO), 1,8-octanediol (ODO), 3,5-diaminobenzoic acid (DABA), pentiptycene, and mixtures thereof, wherein the diamine including at least one of 1,6-hexanediamine (HDA), 1,8-diaminooctane (ODA), 3,5-diaminobenzoic acid (DABA), pentiptycene, and mixtures thereof.

In an exemplary embodiment, the chain extender may include at least one of the following formulas (I) and (II), where x and y may include a —$NH_2$— and an —OH—, respectively.

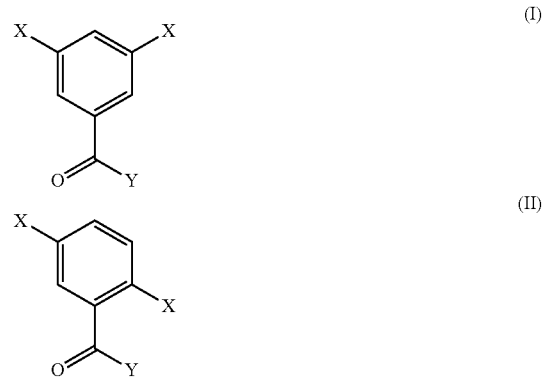

In an exemplary embodiment, the exemplary plasticization-resistant polyurethane membrane may have a weight consisting of weight of the soft and the hard segments, wherein the soft segment may have 60-80 weight percent of the exemplary plasticization-resistant polyurethane membrane weight. In an exemplary embodiment, the exemplary plasticization-resistant polyurethane membrane may exhibit a plasticization-resistance to plasticizing gases, the plasticizing gases may include one or more of $CO_2$, $H_2S$, and hydrocarbon gases. Furthermore, the exemplary plasticization-resistant polyurethane membrane may include a plasticization resistance to plasticizing gases of at least more than 25 bar at 25-50° C. In an exemplary embodiment, the exemplary plasticization-resistant polyurethane membrane may include a thermal stability enhancement up to 100° C. at $T_{50\%}$. In an exemplary embodiment, the exemplary plasticization-resistant polyurethane membrane may include an increase in the Young's modulus of the plasticization-resistant polyurethane membrane by at least more than 1300 MPa. In an exemplary embodiment, the exemplary plasticization-resistant polyurethane membrane may have a thickness of 0.05 μm to 500 μm.

In another general aspect, the present disclosure is directed to an exemplary process for fabricating a plasticization-resistant polyurethane membrane. In an exemplary embodiment, an exemplary process may include synthesizing a polyurethane pre-polymer, synthesizing a polyurethane polymer includes carboxylic acid groups from the synthesized polyurethane pre-polymer, obtaining an acyl chloride polyurethane polymer by functionalizing the synthesized polyurethane polymer, and preparing a plasticization-resistant polyurethane membrane by simultaneously crosslinking and casting the acyl chloride polyurethane polymer.

In an exemplary implementation, synthesizing the polyurethane pre-polymer may include preparing a mixture of a diisocyanate and a polyol compound by adding the diisocyanate to the polyol compound, wherein the polyol compound may include a block copolymer of the formulas $PEG_a$-$PPG_b$-$PEG_a$ and $PPG_b$-$PEG_a$-$PPG_b$, where a and b may include an integer from 3 to 50, fabricating a micro diisocyanate by adding a catalytic compound to the mixture of the diisocyanate and the polyol compound, wherein the catalytic compound may include at least one zinc-based or amine-based catalyst including stannous 2-ethylhexanoate, stannous octanoat, dibutyltin 2-ethylhexanoate, dibutyltin diacetate, dioctylin dimercaptide, N,N-dimethylalkylamines, N-alkylpyrrolidines, bis (dimethylaminopropyl) amine, 1,8-diazabicyclo-5,4,0-undecene-7, 2-Methyl-2-azanorbornane dibutyltin dilaurate (DBTDL), and mixture thereof, and forming a polyurethane pre-polymer by aging the micro diisocyanate.

In an exemplary embodiment, synthesizing the polyurethane polymer may include synthesizing the polyurethane polymer with an average molecular weight of at least 40000 by adding a chain extender to the polyurethane pre-polymer, the chain extender may include a diol and a diamine, wherein the diol including at least one of 1,4-butanediol (BDO), 1,6-hexanediol (HDO), 1,8-octanediol (ODD), 3,5-diaminobenzoic acid (DABA), pentiptycene, and mixtures thereof, wherein the diamine including at least one of 1,6-hexanediamine (HDA), 1,8-diaminooctane (ODA), 3,5-diaminobenzoic acid (DABA), pentiptycene, and mixtures thereof. In an exemplary embodiment, obtaining the acyl chloride polyurethane polymer by functionalizing the synthesized polyurethane polymer may include preparing a first solution by dissolving the synthesized polyurethane polymer in a solvent, the solvent may include of one or more of tetrahydrofuran (THF), N-methylpyrrolidone (NMP). N,N-dimethylacetamide (DMAC), acetone, N,N-diemthylformamide (DMF), dimethyl sulfoxide (DMSO), 1,3-dioxolane, ethanol, n-butanol, isopropyl, toluene, and chloroform. Furthermore, functionalizing the synthesized polyurethane polymer may further include preparing a second solution by adding a thionyl chloride to the first solution and obtaining an acyl chloride polyurethane polymer by distilling out excess amounts of solvent and thionyl chloride from the second solution.

In an exemplary embodiment, preparing a plasticization-resistant polyurethane membrane by cross-linking and casting the polyurethane polymer may include preparing a third solution by dissolving the acyl chloride polyurethane polymer in anhydrous N-Methyl-2-pyrrolidone (NMP), preparing a fourth solution by adding a cross-linking agent to the third solution, and obtaining a cross-linked polyurethane membrane by casting a layer of the fourth solution on a substrate. In an exemplary embodiment the substrate may include a fabric substrate, a clean glass plate, Teflon petri-dish or a relatively porous membrane support, wherein the obtained cross-linked polyurethane membrane may be a plasticization-resistant polyurethane membrane.

In an exemplary embodiment, the cross-linking agent may include one or more of 1,4-butanediol (BDO), 1,6-hexanediol (HDO), 1,6-hexanediamine (HDA), 1,8-octanediol (ODO), and 1,8-diaminooctane (ODA).

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
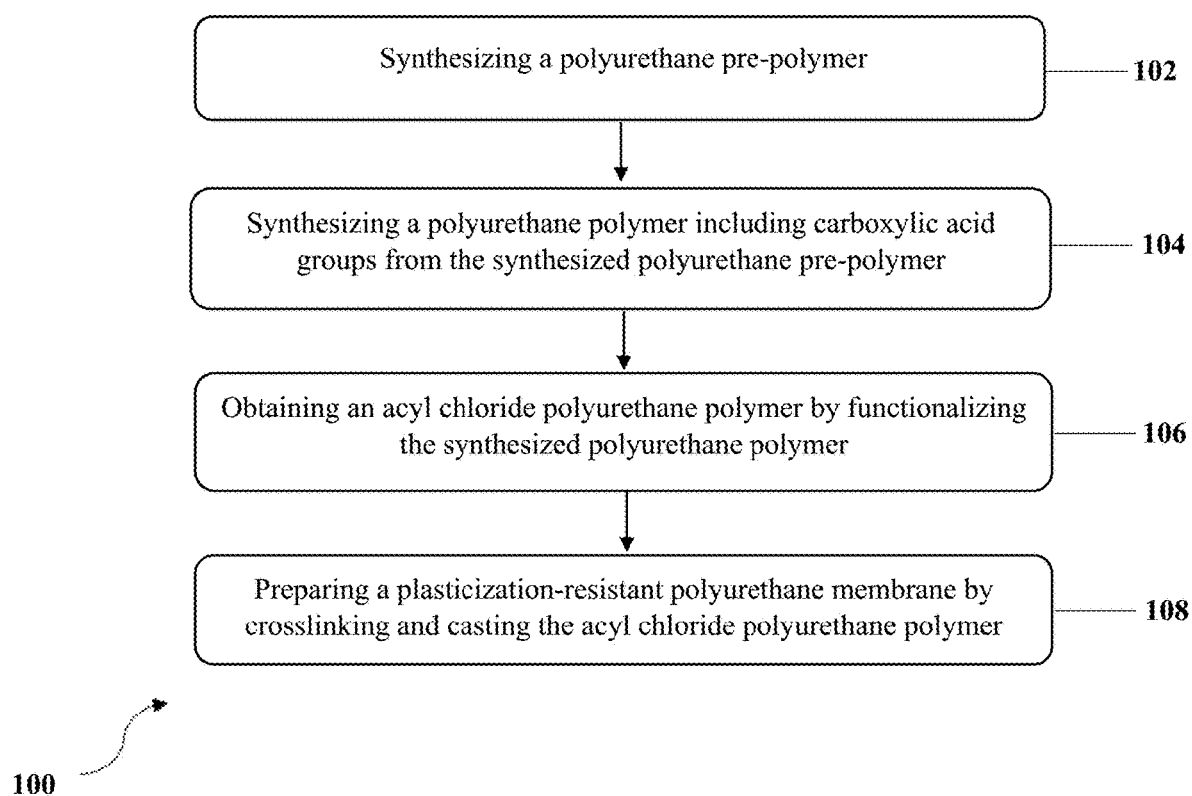
FIG. 1A illustrates an exemplary method for fabricating a plasticization-resistant polyurethane membrane, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings. The following detailed description is, therefore, not to be taken in a limiting sense, and the scope of the present disclosure is defined only by the appended claims.

In this application, an exemplary method of synthesizing a cross-linked polyurethane (PU) membrane with high plasticization-resistant mechanical properties and thermal stability for gas separation is disclosed. Moreover, the cross-linked polyurethane (PU) membrane may have proper gas permeability and selectivity. In an exemplary embodiment, dissolution and chemical cross-linking of PU using a cross-linking agent may be performed simultaneously in an exemplary method of synthesizing the cross-linked polyurethane membrane.

In an exemplary embodiment, the plasticization-resistant PU membrane may include a soft segment, the soft segment may include a polyol compound and a hard segment. In an exemplary embodiment, the hard segment may include a diisocyanate and a chain extender. As the gas molecules mostly pass through the soft domains, increasing the ratio of the soft segment to the hard segment in polyurethane chains may enhance the gas separation performance of membranes. Thus, in order to have a higher gas permeability, polyurethanes with a higher amount of soft segments may be utilized. To achieve a proper gas separation performance including gas permeability and selectivity, PUs with higher Content of soft segments may be utilized. The hard segment of PUs may be synthesized with reaction of the diisocyanate and the chain extenders. In an exemplary embodiment, the soft segment may include 60-80 weight percent of the plasticization-resistant polyurethane membrane weight. In an exemplary embodiment, the soft segment may include a polyether or a polyester with an average molecular weight of 200 to 10000.

In an exemplary embodiment, the polyol compound may include a block copolymer of the formula $PEG_a$-$PPG_b$-$PEG_a$ and the formula $PPG_b$-$PEG_a$-$PPG_b$; where a and b may represent an integer from 3 to 50, the block copolymer may include an average molecular weight of at least 1000.

In an exemplary embodiment, the diisocyanate may include one or more of isophorone diisocyanate (IPDI), toluene diisocyanate (TDI), hexamethylene diisocyanate (HDI), dicyclohexylmethane 4,4'-diisocyanate, methylene diphenyl diisocyanate, diisocyanate-terminated polyester, and diisocyanate-terminated polyether.

In an exemplary embodiment, the chain extender may include a diol and a diamine. In an exemplary embodiment, the diol may include at least one of 1,4-butanediol (BDO), 1,6-hexanediol (HDO), 1,8-octatiediol (ODO), 3,5-diaminobenzoic acid (DABA), pentiptycene, and mixtures thereof. In an exemplary embodiment, the diamine may include at least one of 1,6-hexanediamine (HDA), 1,8-diaminooctane (ODA), 3,5-diaminobenzoic acid (DABA), pentiptycene, and mixtures thereof.

In an exemplary embodiment, the chain extender may include at least one of the following formulas (I) and (II):

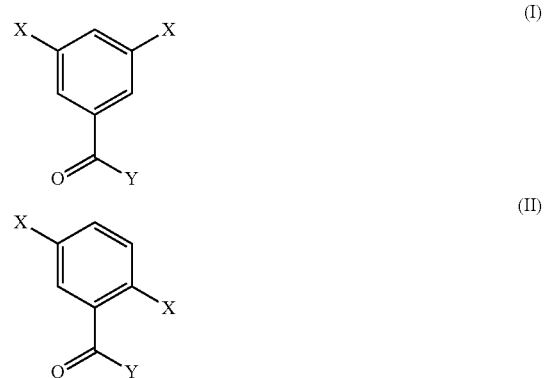

where x and y may be a —$NH_2$— and an —OH— respectively.

In an exemplary embodiment, the plasticization-resistant polyurethane membrane may include covalent ester cross-links.

In an exemplary embodiment, cross-linking of PU membranes may rigidify the chains, reduce the dilution of the polymer, and provide strong resistance to plasticizing gases. In an exemplary embodiment, the plasticization-resistant polyurethane membrane may exhibit a plasticization-resistant behavior to plasticizing gases that may be due to the cross-linking agent. In an exemplary embodiment, the plasticizing gases may include one or more of $CO_2$, $H_2S$, and hydrocarbon gases and the plasticization-resistant polyurethane membrane may include a plasticization resistance to plasticizing gases at least, more than 25 bar, at a temperature ranging from 25 to 50° C.

In an exemplary embodiment, cross-linking may result in a reduced degradation rate in the temperature range of 350-550° C., associated with the degradation of PUs. In an exemplary embodiment, the plasticization-resistant polyurethane membrane may exhibit a great thermal stability improvement up to 100° C. at $T_{50\%}$.

In an exemplary embodiment, mechanical properties of the plasticization-resistant polyurethane membrane may be improved due to both strong interactions between the hard segments and higher phase separation. In an exemplary embodiment, the plasticization-resistant polyurethane membrane may exhibit an increase in the Young's modulus of the plasticization-resistant polyurethane membrane by at least more than 1300 MPa. Further details regarding these exemplary properties may be found further below with respect to Example 4.

In an exemplary embodiment, the plasticization-resistant polyurethane membrane may have a thickness of 0.05 μm to 500 μm.

Preparing a Plasticization-Resistant Polyurethane Membrane

In an exemplary embodiment, FIG. 1A illustrates an exemplary method 100 for fabricating a plasticization-resistant polyurethane membrane, consistent with one or more exemplary embodiments of the present disclosure. As illustrated in FIG. 1A, an exemplary method for fabricating a plasticization-resistant polyurethane membrane may include synthesizing a polyurethane pre-polymer 102, synthesizing a polyurethane polymer including carboxylic acid groups from the synthesized polyurethane pre-polymer 104, obtaining an acyl chloride polyurethane polymer by functionalizing the synthesized polyurethane polymer 106, and preparing a plasticization-resistant polyurethane membrane by crosslinking and casting the acyl chloride polyurethane polymer 108.

Figure 1B:
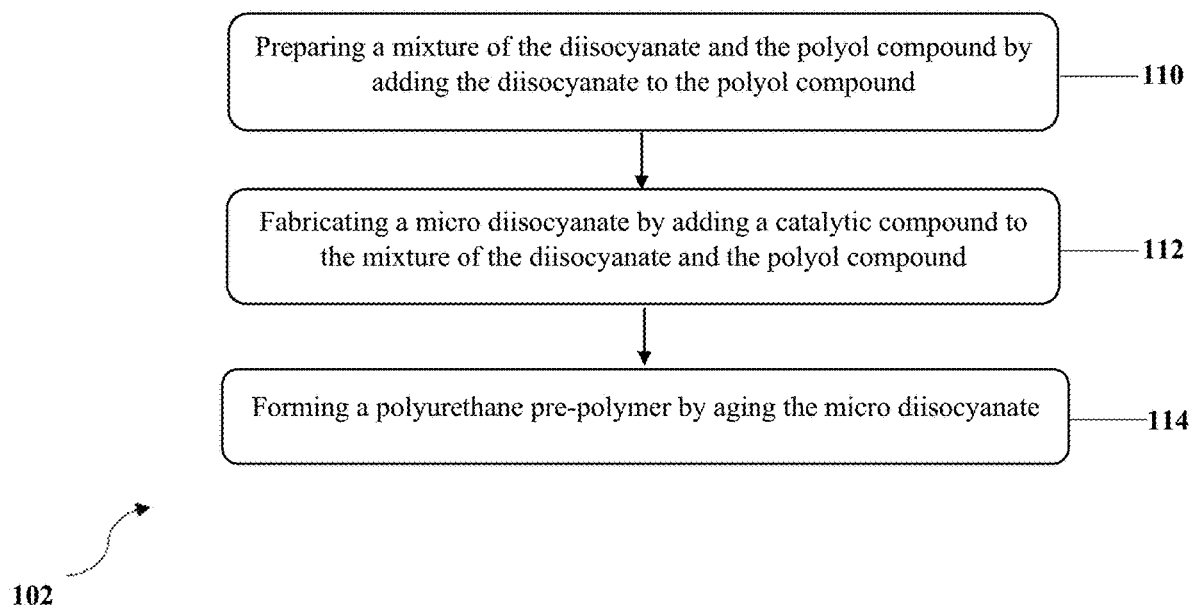
FIG. 1B illustrates an exemplary method synthesizing the polyurethane pre-polymer, consistent with one or more exemplary embodiments of the present disclosure.
Figure 1C:
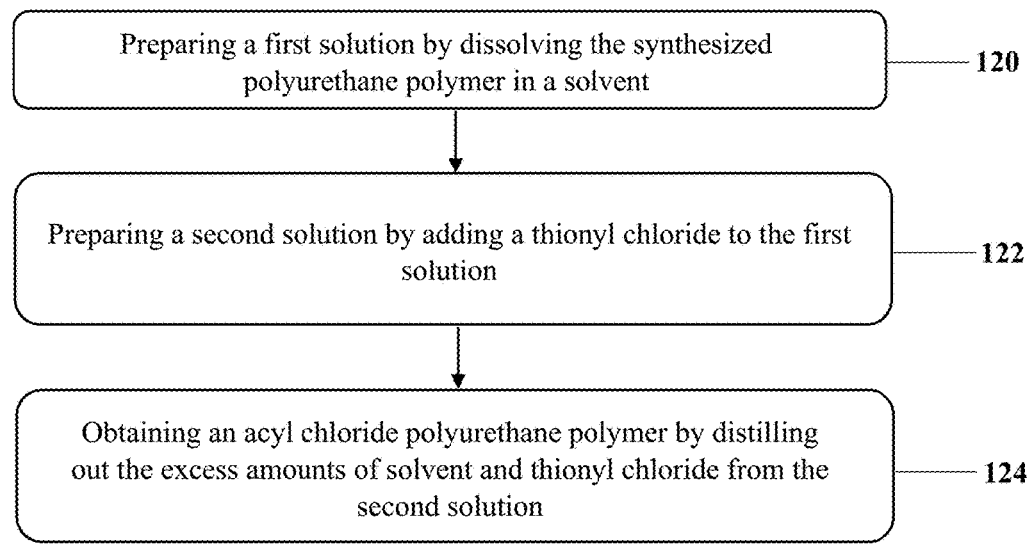
FIG. 1C illustrates an exemplary method for functionalizing the synthesized polyurethane polymer, consistent with one or more exemplary embodiments of the present disclosure.

In an exemplary embodiment, FIG. 1B illustrates a method for synthesizing the polyurethane pre-polymer providing details of step 102 of FIG. 1A, consistent with one or more exemplary embodiments of the present disclosure. As illustrated in FIG. 1B, the exemplary method for synthesizing the polyurethane pre-polymer may include preparing a mixture of the diisocyanate and the polyol compound by adding the diisocyanate to the polyol compound 110, wherein the polyol compound may be a block copolymer of the formula $PEG_a$-$PPG_b$-$PEG_a$ and formula $PPG_b$-$PEG_a$-$PPG_b$, where a and b may represent an integer from 3 to 50. It may further include adding a catalytic compound to the mixture of the diisocyanate and the polyol compound to obtain a micro diisocyanate 112. In an exemplary embodiment, the catalytic compound may include at least one of zinc-based or amine-based catalyst including stannous 2-ethylhexanoate, stannous octanoat, dibutyltin 2-ethylhexanoate, dibutyltin diacetate, dioctyltin dimercaptide, N,N-dimethylalkylamines, N-alkylpyrrolidines, bis (dimethylaminopropyl) amine, 1,8-Diazabicyclo-5,4,0-undecene-7,2-Methyl-2-azanorbornane dibutyltin dilaurate (DBTDL), and mixture thereof. The exemplary method may further include aging the micro diisocyanate at a temperature ranging from 30-90° C. for about 0.5-24 hours to form a polyurethane pre-polymer 114. In an exemplary embodiment, FIG. 1C illustrates a method for functionalizing the synthesized polyurethane polymer providing details of step 106 of FIG. 1A, consistent with one or more exemplary embodiments of the present disclosure. As illustrated in FIG. 1C, an exemplary method for obtaining the acyl chloride polyurethane polymer by functionalizing the synthesized polyurethane polymer may include preparing a first solution by dissolving the synthesized polyurethane polymer in a solvent 120, preparing a second solution by adding a thionyl chloride to the first solution 122, and obtaining an acyl chloride polyurethane polymer by distilling out the excess amounts of solvent and thionyl chloride from the second solution 124. In an exemplary embodiment, the solvent may include one or more of tetrahydrofuran (THF), N-methylpyrrolidone (NMP), N,N-dimethyl acetamide (DMAC), acetone, N,N-dimethylformamide (DMF), dimethyl sulfoxide (DMSO), 1,3-dioxolane, ethanol, n-butanol, isopropyl, toluene, and chloroform.

Figure 1D:
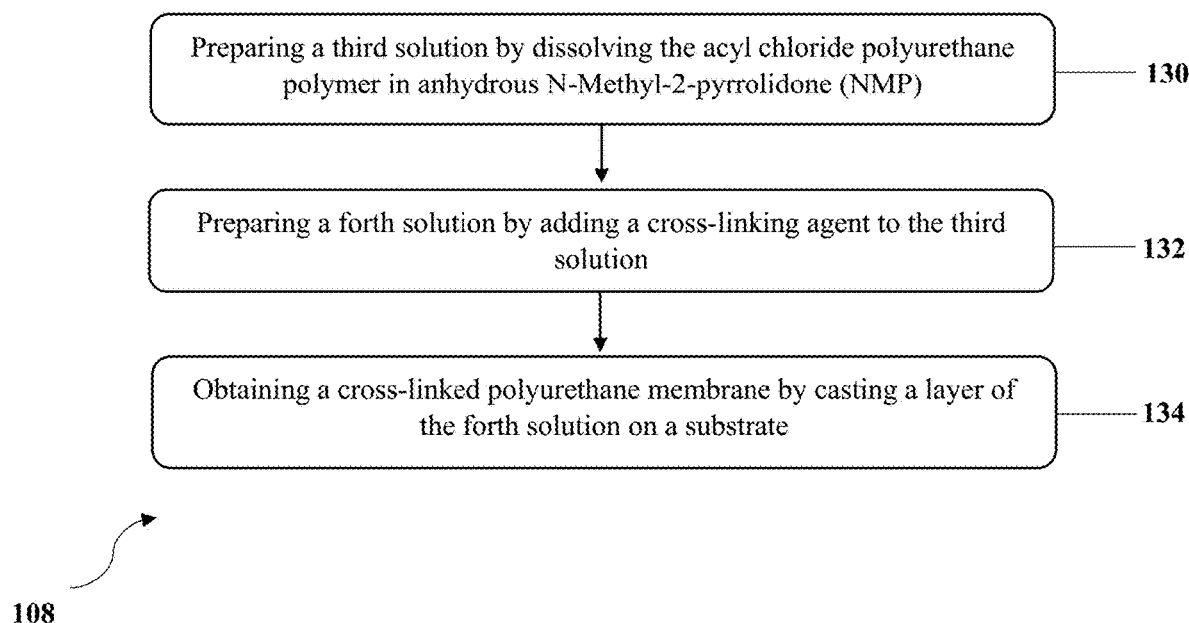
FIG. 1D illustrates an exemplary method for synthesizing the polyurethane polymer, consistent with one or more exemplary embodiments of the present disclosure.

In an exemplary embodiment, FIG. 1D illustrates a method for synthesizing the polyurethane polymer providing details of step 108 of FIG. 1A, consistent with one or more exemplary embodiments of the present disclosure. As illustrated in FIG. 1D, the exemplary method for preparing a plasticization-resistant polyurethane membrane by crosslinking and casting the polyurethane polymer may include preparing a third solution by dissolving the acyl chloride polyurethane polymer in anhydrous N-Methyl-2-pyrrolidone (NMP) 130, preparing a fourth solution by adding a cross-linking agent to the third solution 132, obtaining a cross-linked polyurethane membrane by casting a layer of the fourth solution on a substrate 134. In an exemplary embodiment, the substrate may include a fabric substrate, a clean glass plate, Teflon petri-dish or a relatively porous membrane support, the cross-linking agent may include one or more of 1,4-butanediol (BDO), 1,6-hexanediol (HDO), 1,6-hexanediamine (HDA), 1,8-octanediol (ODO), and 1,8-diaminooctane (ODA), and the obtained cross-linked polyurethane membrane may be a plasticization-resistant polyurethane membrane.

Synthesizing a Polyurethane Pre-Polymer

Polyols containing ether groups such as polyethylene glycol (PEG) and polypropylene glycol (PPG) may be used to improve gas separation properties. Polyethylene glycol (PEG) due to its strong interactions with $CO_2$ may be used for $CO_2$ separation. However, strong tendency of these polyols to make a crystalline structure may hinder gas permeation to the membrane. Also, polypropylene glycol (PPG), due to the presence of the methyl group, may show a bulky structure in applied temperature range for gas separation. Accordingly, simultaneous use of PEG and PPG in a polyethylene chain in the form of a copolymer may be a good solution to obtain a polyurethane membrane with good separation performance.

In an exemplary embodiment, polyurethane pre-polymer may synthesized by a two-step bulk polymerization method. In the first step of an exemplary method, a mixture of diisocyanate and polyol compound may be prepared by adding the diisocyanate to the polyol compound, the polyol compound may include a block copolymer of the following formulas (I) and (II):

$$PEG_a\text{-}PPG_b\text{-}PEG_a \qquad (I)$$

$$PPG_b\text{-}PEG_a\text{-}PPG_b \qquad (II)$$

where a and b may represent an integer from 3 to 50.

Then, in an exemplary embodiment, a catalytic compound may be added to the mixture of the diisocyanate and the polyol compound to obtain a micro diisocyanate. In an exemplary embodiment, the catalytic compound may include at least one of zinc-based or amine-based catalyst including stannous 2-ethylhexanoate, stannous octanoat, dibutyltin 2-ethylhexanoate, dibutyltin diacetate, dioctyltin dimercaptide, N-alkylpyrrolidines, bis (dimethylaminopropyl) amine, 1,8-diazabicyclo-5,4,0-undecene-7,2-methyl-2-azanorbornane dibutyltin dilaurate (DBTDL), and mixture thereof. After that, the micro diisocyanate may be aged in form a polyurethane pre-polymer, that is, after a period of time, a polyurethane pre-polymer is produced from the micro diisocyanate.

Synthesizing a Polyurethane Polymer from the Synthesized Polyurethane Pre-Polymer In an exemplary embodiment, to create active sites for polyurethane networking, the chain extender with an active side-group such as carboxylic acid may be used. In addition, in an exemplary embodiment, diol or diamine monomers which include a hinged side group such as carboxylic acid and its derivatives may be used as a chain extender for synthesizing a polyurethane polymer with a networked structure.

In an exemplary embodiment, to synthesize a polyurethane polymer with an average molecular weight of at least 40000, the chain extender may be added to the synthesized polyurethane pre-polymer for an equimolar adjustment of NCO:OH ratio. In an exemplary embodiment, the chain extender may be a diol or a diamine. In an exemplary embodiment, the diol may include at least one of 1,4-butanediol (BDO), 1,6-hexanediol (HDO), 1,8-octanediol (ODD), 3,5-diaminobenzoic acid fDABA), pentiptycene, and mixtures thereof. In an exemplary embodiment, the diamine may include at least one of 1,6-hexanediamine (HDA), 1,8-diaminooctane (ODA), 3,5-diaminobenzoic acid (DABA), pentiptycene, and mixtures thereof.

Synthesizing an Acyl Chloride Polyurethane Polymer by Functionalizing the Synthesized Polyurethane Polymer In an exemplary embodiment, cross-linked polyurethane membrane may be prepared due to a condensation reaction of diols and diamines with cross-linkable acid functionalities. In an exemplary embodiment, in order to facilitate the condensation reaction, thionyl chloride as the chlorination reagent may be used to increase the conversion efficiency of carboxylic acid groups to acyl chloride groups.

In an exemplary embodiment, a first solution may be prepared by dissolving the synthesized polyurethane polymer in a solvent under the nitrogen atmosphere. Then, a second solution may be prepared by adding about two times the stoichiometric amount of thionyl chloride to the first solution to convert all carboxylic acid groups to acyl chloride, followed by refluxing the second solution. An excess amount of solvent, and thionyl chloride may be distilled out from the second solution and the prepared acyl chloride polyurethane polymer may be stored under vacuum for about 10-24 hours.

In an exemplary embodiment, the solvent may include one or more of tetrahydrofuran (THF), N-methylpyrrolidone (NMP), N,N-dimethyl acetamide (DMAC), acetone, N,N-dimethylformamide (DMF), dimethyl sulfoxide (DMSO), 1,3-dioxolane, ethanol, n-butanol, isopropyl, toluene, and chloroform.

Preparing a Plasticization-Resistant Polyurethane Membrane by Simultaneously Cross-Linking and Casting the Acyl Chloride Polyurethane Polymer Important factors for improving both separation properties and plasticization-resistance of polyurethane membrane may include choosing the light method for cross-linking of polyurethane, cross-linking agent, and cross-linking density. In this regard, carboxylic acid groups may be introduced in the polyurethane chains and may serve as the cross-linking active sites. The crosslinking of polyurethane may occur by the reaction of diols and diamines with the acidic groups. In an exemplary embodiment, to enhance the esterification reaction rate of carboxylic acids with diols and diamines, the carboxylic acid groups may be converted to acyl chloride groups.

In an exemplary embodiment, the acyl chloride polyurethane may be dissolved in anhydrous N-Methyl-2-pyrrolidone (NMP) to prepare a third solution and then to prepare a fourth solution, an excess amount of the cross-linking agent may be added to the third solution. In an exemplary embodiment, the excess amount of N-Methyl-2-pyrrolidone (NMP) may be determined to be about 70 times of the stoichiometric amount.

In an exemplary embodiment, aliphatic or aromatic diols and diamines with different structures and length including ethylene glycol (EG), ethylene diamine (EDA), 1,4-butanediol (BDO), 1,4-butanediamine (BDA), 1,6-hexanediol (HDO), 1,6-hexanediamine (HDA), 1,8-octanediol (ODO), and 1,8diaminooctane (ODA) may be used as the cross-linking agent. In an exemplary embodiment, the cross-linking agents with the longer carbon chain length including HDO, HDA, ODO and ODA may be utilized.

In an exemplary embodiment, to remove all undissolved particles, the fourth solution may be filtered. Then, the filtered solution may be cast on a substrate and dried in the oven at 70-100° C. for about 24 h. The obtained film may be further dried under vacuum at 70-110° C. for about 24 h to remove any residual solvents.

In an exemplary embodiment, the substrate may include a fabric substrate, a clean glass plate, Teflon petri-dish, or a relatively porous membrane support.

Example 1: Copolymer-Based Polyurethane Synthesis and Membrane Preparation Thereof In Example 1, a series of polyurethane (PU) structures were synthesized consistent with the teachings of the exemplars embodiments of the present disclosure. In this case, PU structures were synthesized with a PEG-b-PPG triblock copolymer including $PEG_2\text{-}PPG_{31}\text{-}PEG_2$, $PEG_{11}\text{-}PPG_{16}\text{-}PEG_{11}$, or $PEG_9\text{-}PPG_{23}\text{-}PEG_9$ as a polyol, isophorone diisocyanate (IPDI) as diisocyanate and 1,8-diaminooctane (ODA) as a chain extender. Three other types of PUs were synthesized with PPG, PEG and the mixture of PPG and PEG (50/50 weight percent) as the polyols, isophorone diisocyanate (IPDI) as diisocyanate and 1,8-diaminooctane (ODA) as chain extenders which are designated as $PEG_{45}$, PPG$_{34}$, and PEG$_{45}$/PPG$_{34}$, respectively. In all samples, PU synthesis was carried out by a two-step bulk polymerization method.

To start polymerization reaction, 15-300 millimole of isophorone diisocyanate (IPDI) was added to 5-100 millimole of dry polyol during 5-60 minutes. To complete and speed up the reaction 0.1-1 ml of 2-Methyl-2-azanorbornane dibutyltin dilaurate (DBTDL) catalyst was added to the medium at a temperature range of 30-90° C. for a duration of 0.5-24 hours. PU pre-polymer with isocyanate end groups was produced by the reaction of diisocyanate and polyol. This pre-polymer has no proper mechanical properties. Therefore, in the second step of the reaction, 10-200millimole of octane-diamine (ODA), as the third monomer, was added to the reactor to react with the remaining diisocyanates and synthesized pre-polymer. Thereby, with the expansion of the chain, PU with appropriate molecular properties and molecular weight was produced. Then, the synthesized PU was dissolved in N,N-dimethylformamide (DMF) (10 weight percent) and cast in a Teflon petri dish (5 cm diameter). PU film was fabricated by evaporation of N,N-dimethylformamide (DMF) at 60° C. and dried under a vacuum at 80° C. for 24 hours to remove any residual solvent.

Example 2: Cross-Linked Copolymer-Based Polyurethane Synthesis and Membrane Preparation Thereof In this example, a series of PU structures with the capability of cross-linking was synthesized by a two-step bulk polymerization method same as Example 1, pursuant to the teachings of exemplary embodiments of the present disclosure. So that the PEG$_2$-PPG$_{31}$-PEG$_2$ was used as the polyol, IPDI as diisocyanate and 3,5-diaminobenzoic acid (DABA) as the chain extender. The synthesized polyurethane with the PEG$_2$-PPG$_{31}$-PEG$_2$ as the polyol, IPDI as diisocyanate and 3,5-diaminobenzoic acid (DABA) as the chain extender represents as pristine PU. Then, the synthesized PU with DABA as chain extender was dissolved in tetrahydrofuran (THF) and two times of the stoichiometric amount of thionyl chloride was added to the dissolved polymer solution to convert all the carboxylic acid groups to acyl chloride; the reaction was refluxed for about 8 hours. Then, excess amounts of tetrahydrofuran (THF) and thionyl chloride were distilled out and the prepared acyl chloride PU was stored under vacuum at 50° C. overnight, that is for longer than a 10 hours period of time. The acyl chloride PU was dissolved in anhydrous N-methylpyrrolidone (NMP) (about 5 weight percent) and an excess amount (about 70 times of the stoichiometric amount) of a diol or a diamine including BDO, HDO, HDA, ODO, and ODA as cross-linking agent was added for further reaction.

To prepare the cross-linked PU membrane the polymer solution was cast in a Teflon petri-dish and kept in the oven at 70-100° C. for about 24 hours. Finally, to remove the residual solvents, the film was placed in a vacuum oven for about 24 hours at 70-110° C. and cross-linked PU (XPU) was produced. Cross-linked copolymer-based PUs are designated as XPU-n which X represents cross-linked PU and n represents cross-linking agent.

Example 3: Polyurethane Membrane Characterization

In Example 3, the results of some characterization methods performed on the synthesized Pus and the prepared membrane thereof (produced as described in detail in connection with Examples 1, 2) are presented.

Figure 2:
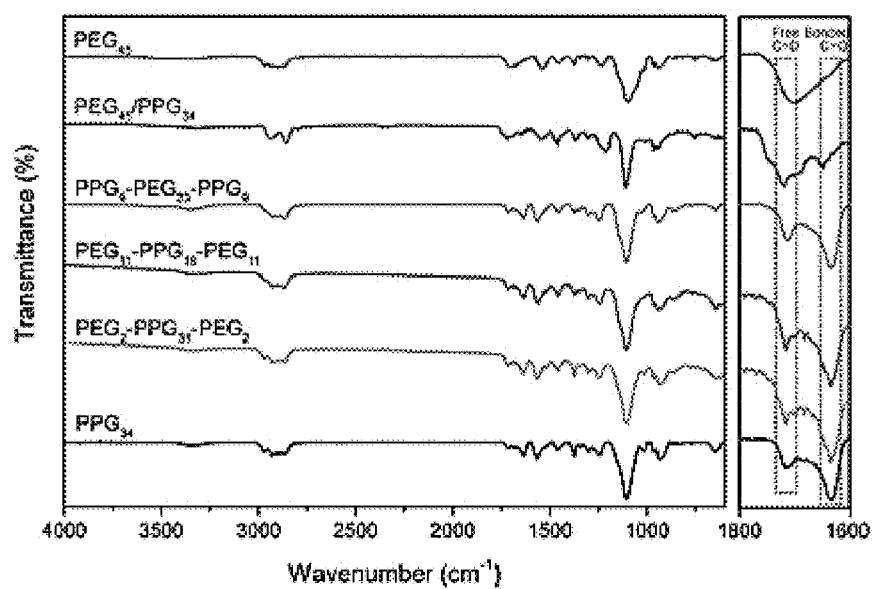
FIG. 2 illustrates a Fourier transform infrared spectroscopy (FTIR) spectra of all synthesized PUs according to Example 1, consistent with one or more exemplary embodiments of the present disclosure.

Referring to FIG. 2, the Fourier transform infrared spectroscopy (FTIR) spectra of all synthesized PUs according to Example 1, is illustrated, consistent with one or more exemplary embodiments of the present disclosure. The disappearance of the NCO peak at 2250 cm$^{-1}$ indicates the completion of the polymerization reaction. Although die position of the characteristic bands is similar in all of the synthesized PUs, obvious changes in the region of 1800-1600 cm$^{-1}$ related to the carbonyl peaks may be seen. Analysis of the C=O stretching vibration reveals the phase separation of the hard segment, and the soft segment in the PUs; the NH groups are more likely to create hydrogen bonding with two proton acceptor functional groups: (i) ether linkages in the soli segment and (ii) C=O in urethane functionality. The type and strength of these hydrogen bonds may be identified by the differences in the intensity and the shift of double peaks in 1800-1600 cm$^{-1}$ region. The lower frequency peak (around 1630 cm$^{-1}$) corresponds to the hydrogen bonded carbonyl groups with N—H functionalities. The higher frequency peak (around 1720 cm$^{-1}$) corresponds to the free carbonyl groups and indicates the hydrogen bonding interactions between the C—O—C and N—H groups. As shown in FIG. 2, the free carbonyl peak in the PEG$_{45}$ is apparent while the intensity of this band is diminished for other synthesized PUs, along with an increase in the bonded carbonyl peak. It is also clear that the intensity of the bonded carbonyl peak for PUs with PPG segments is increased and completely separated from the free carbonyl band.

Figure 3:
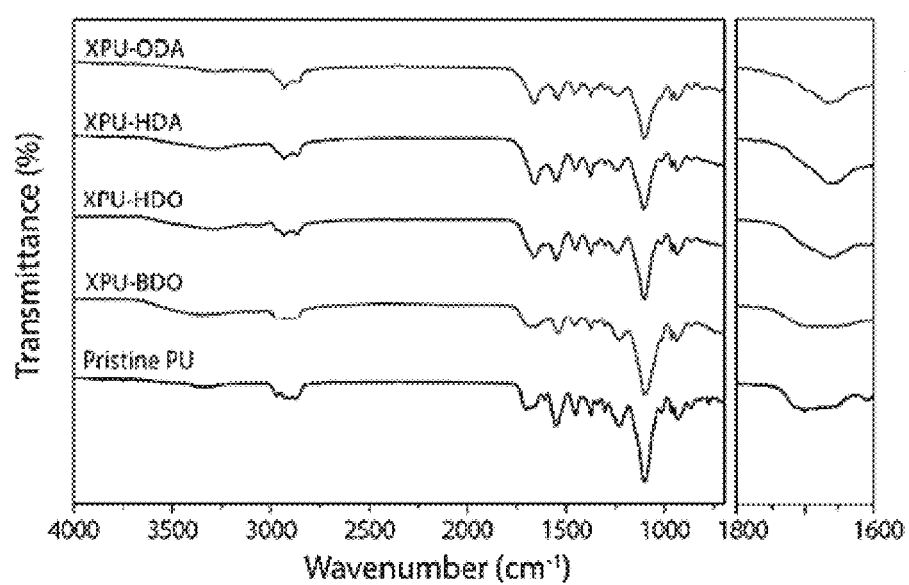
FIG. 3 illustrates a FTIR spectra of all synthesized PUs according to Example 2, consistent with one or more exemplary embodiments of the present disclosure.

Referring to FIG. 3, the FTIR spectra of all synthesized PUs according to Example 2 is illustrated, consistent with one or more exemplary embodiments of the present disclosure. FTIR spectra were considered to explore the possible influence of cross-linking reaction on the phase separation of the hard segment and the soft segment in PU. The analysis of the C=O stretching vibration (1800-1600 cm$^{-1}$) in FIG. 3 reveals the phase separation of the soft and hard segments. The disappearance of the free carbonyl peak (at around 1700 cm$^{-1}$) and the shift to the bonded carbonyl region (at around 1620 cm$^{-1}$) may indicate higher phase separation for XPU membranes. New cross-linked bonds within the hard segments result in higher phase separation for XPUs. Stronger interactions between the cross-linked hard segments may make them reluctant to mix with soft segment chains.

Figure 4:
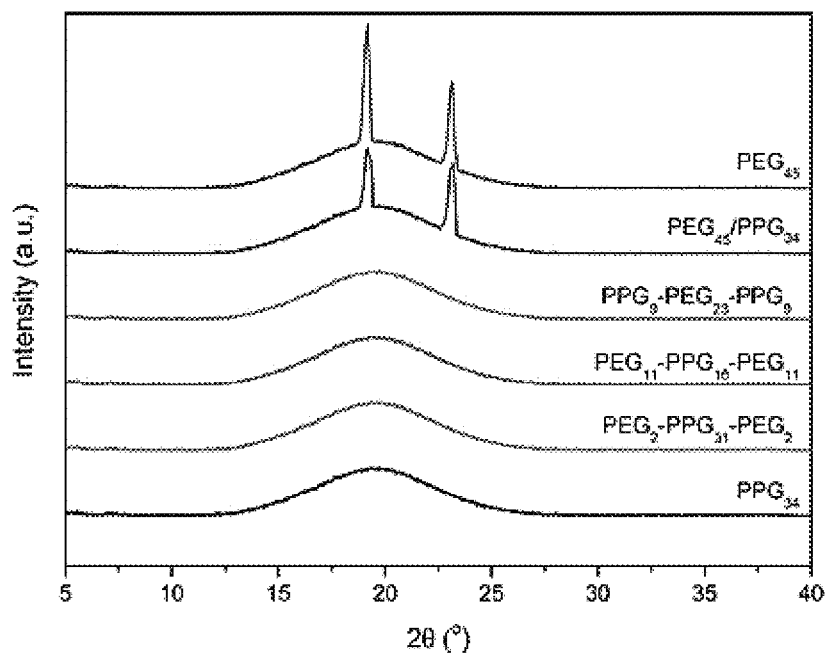
FIG. 4 illustrates X-ray diffraction pattern of the synthesized PUs according to Example 1, consistent with one or more exemplary embodiments of the present disclosure.

Referring now to FIG. 4, X-ray diffraction pattern of the synthesized PUs according to Example 1 is shown, consistent with one or more exemplary embodiments of the present disclosure. FIG. 4 exhibits a dominant, amorphous halo around 2θ=20° which is attributed to the small crystallites in the PUs structure. The spectrum of the PEG-based PU reveals a double sharp peak appeared at 2θ=19° and 23.5° which are associated with the highly crystalline structure of the soft domains and matches well with the reported peak positions of pure PEG. The PEG$_{45}$/PPG$_{34}$ sample exhibits the similar crystalline structure but with lower crystallinity compared to the PEG-based PU. In particular, the irregular structure of PPG prevents the formation of PEG crystalline structure as the methyl side group hinders the movement of PEG soft segment during the process of melting and crystallization.

Figure 5:
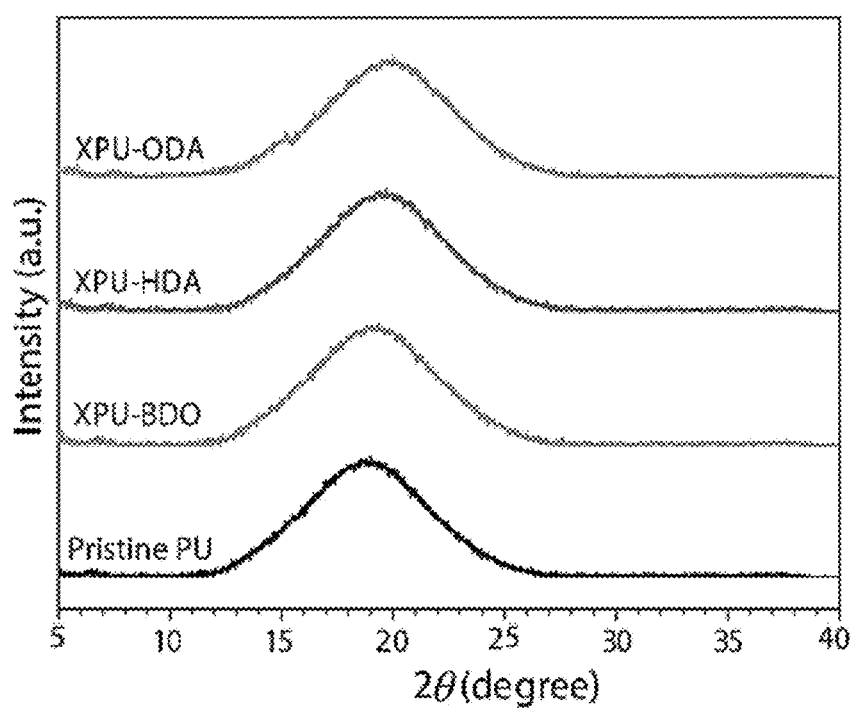
FIG. 5 illustrates X-ray diffraction pattern of the synthesized PUs according to Example 2, consistent with one or more exemplary embodiments of the present disclosure.

Referring to FIG. 5, X-ray diffraction pattern of the synthesized PUs according to Example 2 is shown, consistent with one or more exemplary embodiments of the present disclosure. As shown in FIG. 5, the presence of a broad halo in all samples confirms a dominant amorphous structure in the synthesized PUs. This behavior is consistent with DSC results which showed no melting peaks during heating cycles.

Figure 6:
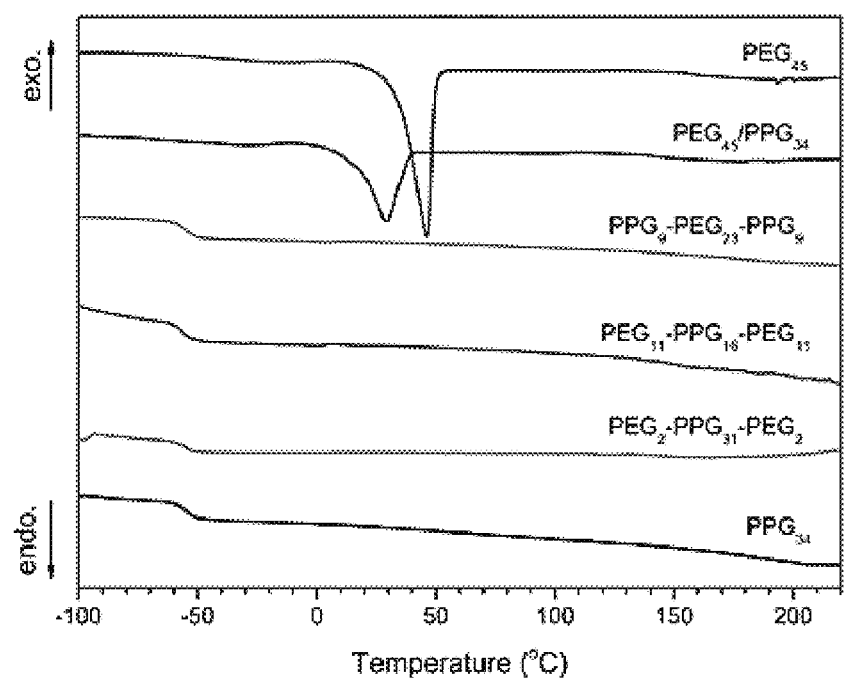
FIG. 6 illustrates differential scanning calorimetry (DSC) thermograms of the synthesized PUs according to Example 1, obtained in the second heating program after removing the thermal history of the polymers, consistent with one or more exemplary embodiments of the present disclosure.

FIG. 6 illustrates the differential scanning calorimetry (DSC) thermograms of the synthesized PUs according to Example 1, obtained in the second heating program after removing the thermal history of the polymers, consistent with one or more exemplary embodiments of the present disclosure. The $PEG_{45}$ and $PEG_{45}/PPC_{34}$ samples exhibit an endothermic peak at a temperature lower than the melting point of pure PEG that is about 63.5° C. The melting peak of the $PEG_{45}/PPG_{34}$ sample broadens and shifts to a lower temperature compared to that of the $PEG_{45}$ sample. That may be due 10 the presence of methyl side groups in PPG which disturb the PEG crystalline structure. This effect is stronger in PEG-b-PPG triblock copolymers as each copolymer contains PPG segments. The presence of PPG deteriorates the regular chain packing and thereby prevents the crystallization of the soft segment. Moreover, the suppression of crystallinity is expected for the PUs based on the triblock PEG-b-PPG diols owing to the shorter PEG chain length compared to the $PEG_{45}$ and $PEG_{45}/PPG_{34}$ samples with longer PEG segments. Therefore, the synthesized PEG-b-PPG based PUs are completely amorphous above $T_g$. The $T_g$ of the $PEG_{45}$ and $PEG_{45}/PPG_{34}$ samples are around −37° C. However, the $T_g$ of PEG-b-PPG-based PUs decreases to around −55° C., indicating more phase separation than the $PEG_{45}$ and $PEG_{45}/PPG_{34}$ samples. The spatial hindrance of methyl side groups inhibits the formation of hydrogen bonds between the soft and hard segments. However, the methyl side group constrains the chain mobility and hence the $T_g$ of $PPG_{34}$ decreases from −54.8° C. to −57° C. for the $PEG_{11}$-$PPG_{16}$-$PEG_{11}$ sample.

Figure 7:
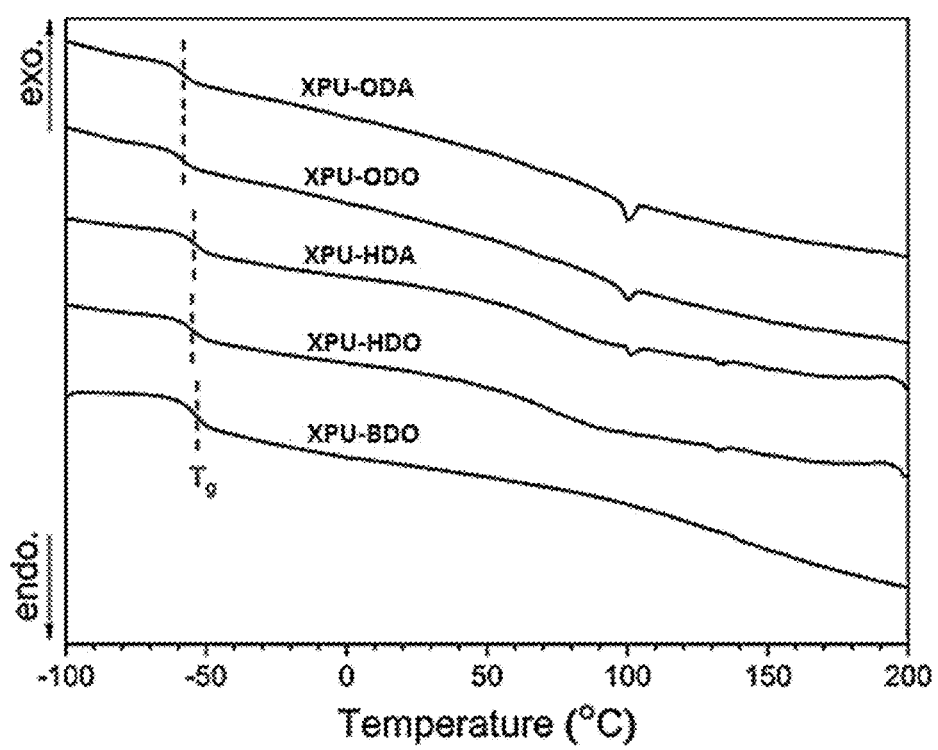
FIG. 7 illustrates differential scanning calorimetry (DSC) thermograms of the synthesized PUs according to Example 2, consistent with one or more exemplary embodiments of thepresent disclosure.

FIG. 7 illustrates the differential scanning calorimetry (DSC) thermograms of the synthesized PUs according to Example 2, consistent with, one or more exemplary embodiments of the present disclosure. DSC measurements were carried out to investigate the effect of cross-linking on the glass transition temperatures ($T_g$) and phase separation behaviors of synthesized PUs. In XPUs membranes, the $T_g$ dropped to lower temperatures compared to the pure PU membranes, may indicate smaller amount of hard segments is present in the soft domains (i.e., higher phase separation). Cross-linking may provide covalent and hydrogen bonding interactions between the hard segments, which may be a strong driving force to achieve a more phase-separated PU structure. According to FIG. 7, the largest decrease in $T_g$ (around 8° C.) may relate to XPU-ODA with the highest cross-linked density. The DSC thermograms display a melting point ($T_m$) peak at around 100° C. in the cross-linked PUs. As the soft segment could not practically crystalize, this endothermic peak may be mainly attributed to the oriented chains directed at the interphase of the hard and soft segments.

Figure 8:
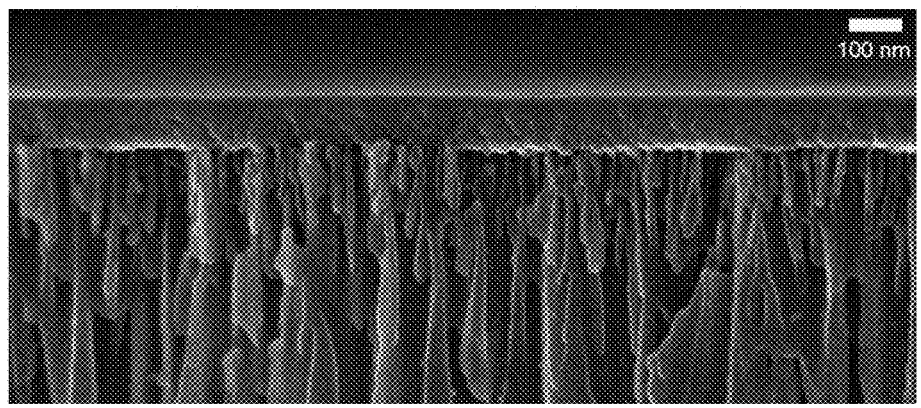
FIG. 8 illustrates a cross-sectional scanning electron microscope (SEM) image of the thin film composite membrane of XPU-HDA on a-alumna porous substrate, consistent with one or more exemplary embodiments of the present disclosure.

In FIG. 8, a cross-sectional scanning electron microscope (SEM) image of the thin film composite membrane of XPU-HDA on a porous alumna substrate is shown, consistent with one or more exemplary embodiments of the present disclosure. As illustrated in FIG. 8, the thickness of the XPU-HDA sample determined to be around 100 nm.

Example 4: Evaluation of Selectivity, Permeability, Plasticization-Resistant, Thermal and Mechanical Properties of the Synthesized PU Membranes In this example, the results of selectivity, permeability, plasticization-resistant, thermal and mechanical properties of the PU membranes (prepared as described in detail in connection with Examples 1 and 2) are presented.

Figure 9:
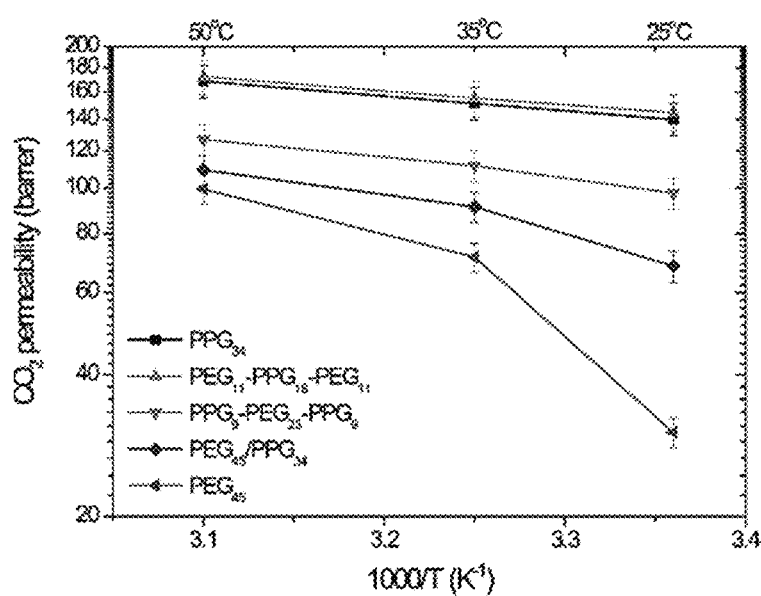
FIG. 9 illustrates the influence of the soft segment composition on the transport properties of various gases ($CO_2$, $CH_4$, $N_2$, and $H_2$) bar and with temperature ranges of 25° C. to 50° C. consistent with one or more exemplary embodiments of the present disclosure.

Referring now to FIG. 9, the influence of the soft segment composition on the transport properties of various gases ($CO_2$, $CH_4$, $N_2$, and $H_2$), at a pressure of 4 bar and in a temperature range of 25° C. to 50° C., consistent with one or more exemplary embodiments of the present disclosure, is shown. This result explains that physically mixed PPG and PEG soft segments in $PEG_{45}/PPG_4$ sample do not significantly enhance the gas permeability, nor suppress the PEG crystallinity compared to the PEG-b-PPG-based PUs (the $PEG_{11}$-$PPG_{16}$-$PEG_{11}$ and the $PEG_9$-$PPG_{23}$-$PEG_9$ samples). The synthesized PUs based on the PEG-b-PPG soft segments show significantly higher gas permeability. The $CO_2$ permeability of the $PEG_{11}$-$PPG_{16}$-$PEG_{11}$ membrane is enhanced by a factor of two compared to that of the blend $PEG_{45}/PPG_{34}$ sample with similar PEG content (50 weight percent). The higher gas permeability is related to the strong benefits of the distribution of PPG and PEG units in a single soft segment which results in higher chain flexibility and an amorphous structure over a wide range of temperature (no melting peaks is observed in the DSC profiles). In contrary to the $CO_2$ permeability, the other gases show a different permeability trend. The permeability values of $H_2$, $N_2$ and $CH_4$ in the synthesized PU membranes decrease in the following order: $PPG_{34}$>$PEG_2$-$PPG_{31}$-$PPG_2$>$PEG_{11}$-$PPG_{16}$-$PPG_{11}$>$PPG_9$-$PEG_{23}$-$PPG_9$>$PEG_{45}$. Replacing PPG with PEG in the PU structure lowers phase separation and reduces fractional free volume, which results in a decrease of gas permeability, however, the $CO_2$ permeability of $PEG_{11}$-$PPG_{16}$-$PEG_{11}$ is not changed when compared to the $PPG_{34}$ and $PEG_2$-$PPG_{31}$-$PPG_2$ membranes. Higher PEG concentration, more phase-separated and amorphous structure of the $PEG_{11}$-$PPG_{16}$-$PPG_{11}$ sample enhances the $CO_2$ permeability more than to the other gases. Furthermore, the importance of the PEG chain length within the soft segments is evident where the $CO_2$ permeability of $PPG_9$-$PEG_{23}$-$PPG_9$ is decreased by 30% as compared to the value of $PEG_{11}$-$PPG_{16}$-$PPG_{11}$. The longer PEG chain length in the $PPG_9$-$PEG_{23}$-$PPG_9$ is more likely to crystallize and form stronger hydrogen bonding interactions with the hard segments than the $PEG_{11}$-$PPG_{16}$-$PPG_{11}$ is with shorter PEG segment (i.e. more phase mixing).

Figure 10A:
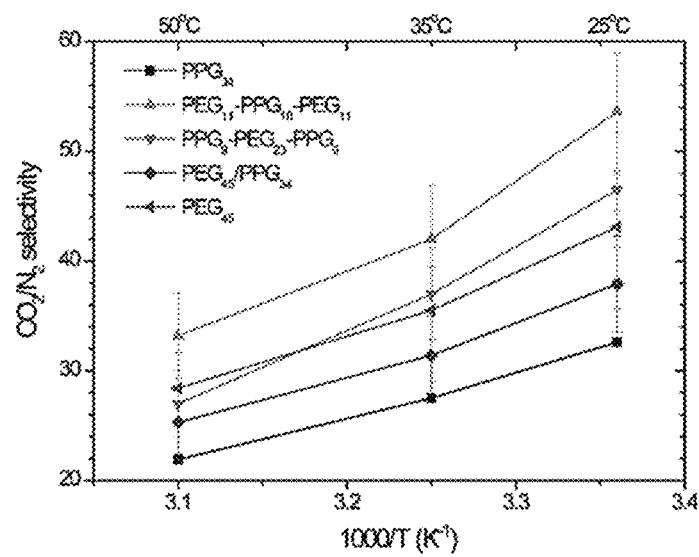
FIG. 10A illustrates the effect of temperature on the $CO_2/N_2$ selectivity, consistent with one or more exemplary embodiments of the present disclosure.
Figure 10B:
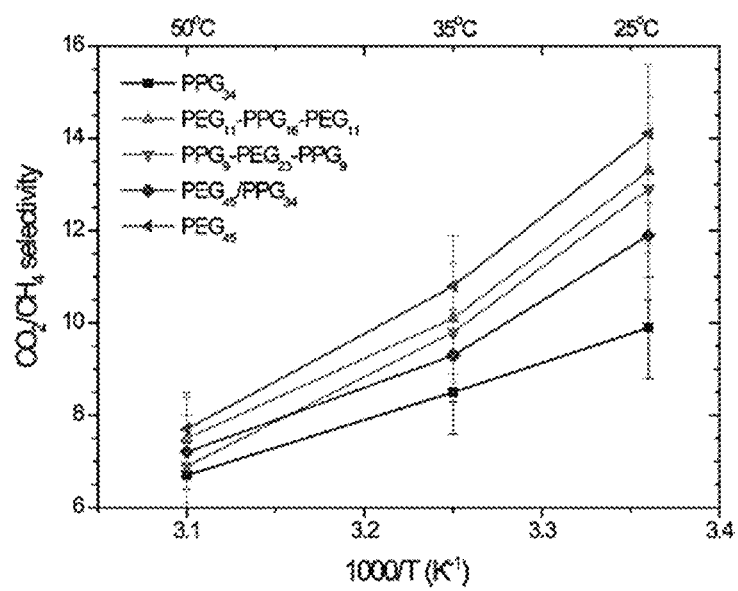
FIG. 10B illustrates the effect of temperature on the $CO_2/CH_4$ selectivity, consistent with one or more exemplary embodiments of the present disclosure.
Figure 10C:
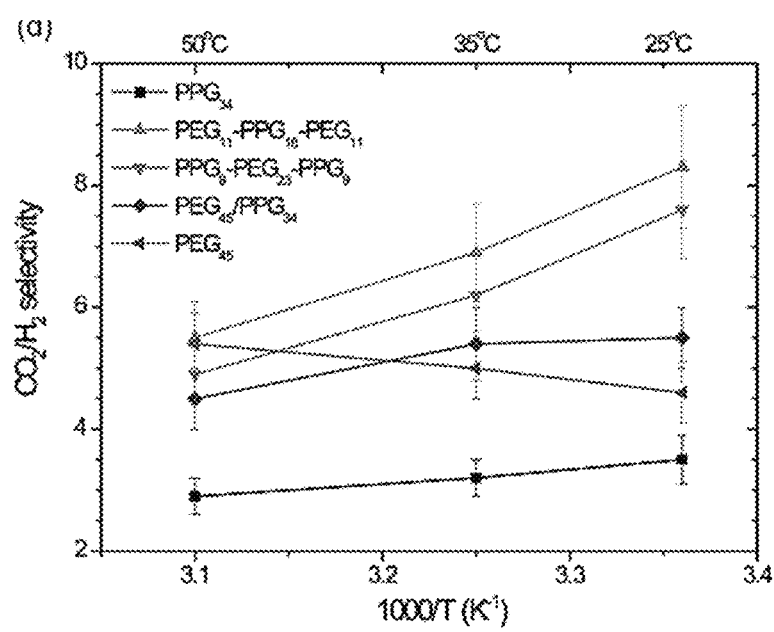
FIG. 10C illustrates the effect of temperature on the $CO_2/H_2$ selectivity, consistent with one or more exemplary embodiments of the present disclosure.

Referring to FIGS. 10A-10C, the effect of temperature on the $CO_2/N_2$, $CO_2/CH_4$, and $CO_2/H_2$ selectivity, is shown, consistent with one or more exemplary embodiments of the present disclosure. The $CO_2/x$ gas selectivity of $PPG_{34}$ and PEG-b-PPG-based PUs is linear over the entire temperature range in which the PUs are completely amorphous. The $CO_2$ selectivity of PEG-b-PPG-based PUs is higher than that of $PPG_{34}$ membrane due to an increase in the $CO_2$ solubility selectivity. FIG. 10C illustrates that the $CO_2/H_2$ separation of PEG-b-PPG-based PU membranes is very promising at room temperatures, whereas it is decreased for $PEG_{45}$ and $PEG_{45}/PPG_{34}$ membranes at the temperatures below the PEG melting point. The crystallinity of the PEG soft segment highlights the size sieving effect, which is mainly responsible for the decrease in $CO_2/H_2$ and increase in the $CO_2/N_2$ and $CO_2/CH_4$ selectivities. The size sieving effect limits the ability of larger gas molecules (such as $N_2$ and $CH_4$) to pass through the membrane compared, to smaller gas molecules (such as $CO_2$ and $H_2$). Consequently, the $CO_2/H_2$ selectivity of $PEG_{45}$ and $PEG45/PPG_{34}$ membranes show an opposite trend compared to the $CO_2/N_2$ and $CO_2/CH_4$ selectivities over the all temperature ranges investigated.

Figure 11A:
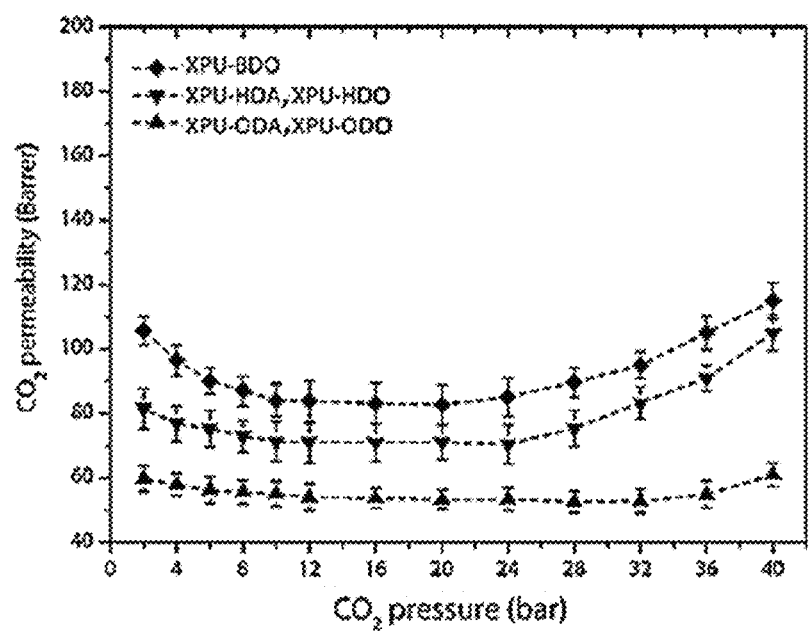
FIG. 11A illustrates plasticization behavior of the series of cross-linked membrane with different cross-linking agents (according to Example 2), based on $CO_2$ permeability versus pressure, consistent with one or more exemplary embodiments of the present disclosure.
Figure 11B:
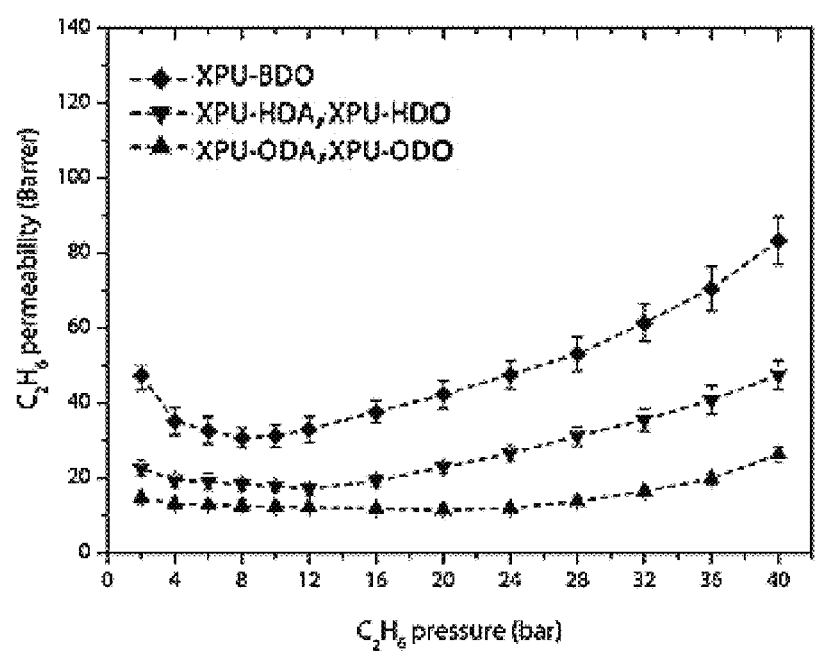
FIG. 11B illustrates plasticization behavior of the series of cross-linked membrane with different cross-linking agents (according to Example 2), based on $C_2H_6$ permeability versus pressure, consistent with one or more exemplary embodiments of the present disclosure.

Referring now to FIGS. 11A-11B, plasticization behavior of the series of cross-linked PU membranes (XPU) with different, cross-linking agents (according to Example 2), consistent with one or more exemplary embodiments of the present disclosure, is shown. To explore possible plasticization behavior of membranes, $CO_2$ permeability studies were conducted over a pressure range of 2 to 40 bar. The plasticization study of other gases is not reported since $H_2$, $N_2$ and $CH_4$ do not plasticize PU membranes. Due to the non-ideal behavior of $CO_2$ at elevated pressures, fugacity was used to calculate the gas permeability.

FIG. 11A illustrates plasticization behavior of the series of cross-linked membrane with different cross-linking agent (according to Example 2), based on $CO_2$ permeability versus pressure, consistent with one or more exemplary embodiments of the present disclosure. As shown in FIG. 11A, the $CO_2$ permeability of the samples at different pressures up to 40 bar suggests that XPU membranes may well endure against condensable $CO_2$ gas. The plasticization improvement for XPU membranes may depend on the employed cross-linking agents. For example, XPU-ODA/ODO, XPU-HDA/HDO and XPU-BDO membranes do not show any signs of plasticization up to approximately 36, 24 and 20 bar, respectively. Chemical cross-linking of PU membranes may rigidity the chains, reduce the dilution of the polymer and provide strong resistance to $CO_2$ plasticization.

FIG. 11B illustrates plasticization behavior of the series of cross-linked membrane with different cross-linking agent (according to Example 2) based on $C_2H_6$ permeability versus pressure, consistent with one or more exemplary embodiments of the present disclosure. As shown in FIG. 11B, plasticization-resistant of XPU-BDO, XPU-HDA/HDO and XPU-ODA/ODO membranes undergo $C_2H_6$ is about 12, 20 and 28 bar respectively.

Figure 12:
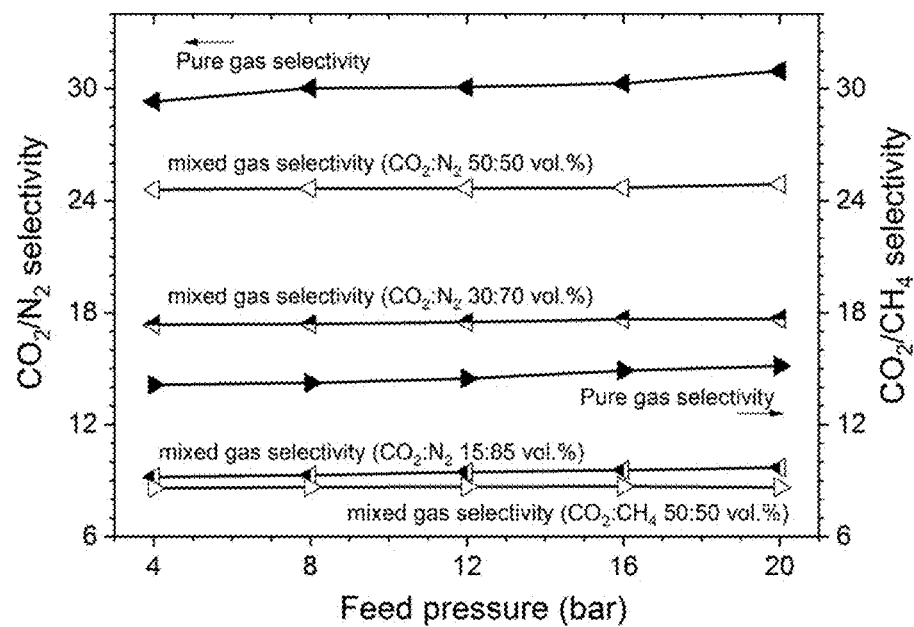
FIG. 12 illustrates the $CO_2/N_2$ and $CO_2/CH_4$ ideal selectivity and separation factor for XPU-HDA samples, consistent with one or more exemplary embodiments of the present disclosure.

FIG. 12 illustrates the $CO_2/N_2$ and $CO_2/CH_4$ ideal selectivity and separation factor for XPU-HDA samples, consistent with one or more exemplary embodiments of the present disclosure. The mixed gas transport properties were carried out using three different types of $CO_2/N_2$ gas mixtures ($CO_2/N_2$ ratio of 15:85, 30/70, and 50/50 weight percent) to mimic a flue gas separation process. The difference in the permeability and the selectivity of pure gas and mixed gas systems may be ascribed to the effects of gas mixture concentration, penetrants competition and phase nonidealities. The $CO_2/N_2$ ideal selectivity of 30 decreased to 9.5 for $CO_2/N_2$ gas mixture with the concentration of 15 and 85 weight percent, respectively. This may be due to severe competitions between $CO_2$ and $N_2$ to pass through the membrane at large $N_2$ concentration. However, the $CO_2/N_2$ separation factor was observed at 24 for $CO_2/N_2$ feed gas containing 50 weight percent $N_2$ concentration. The decrease from ideal separation for $CO_2/CH_4$ (in the $CO_2/CH_4$ ratio of 50/50 weight percent) is larger than the observed reduction for $CO_2/N_2$ (in the $CO_2/N_2$ ratio of 50/50 weight percent) gas mixture. It is thought that $CO_2$ solubility is diminished more upon competitive sorption with $CH_4$.

Figure 13A:
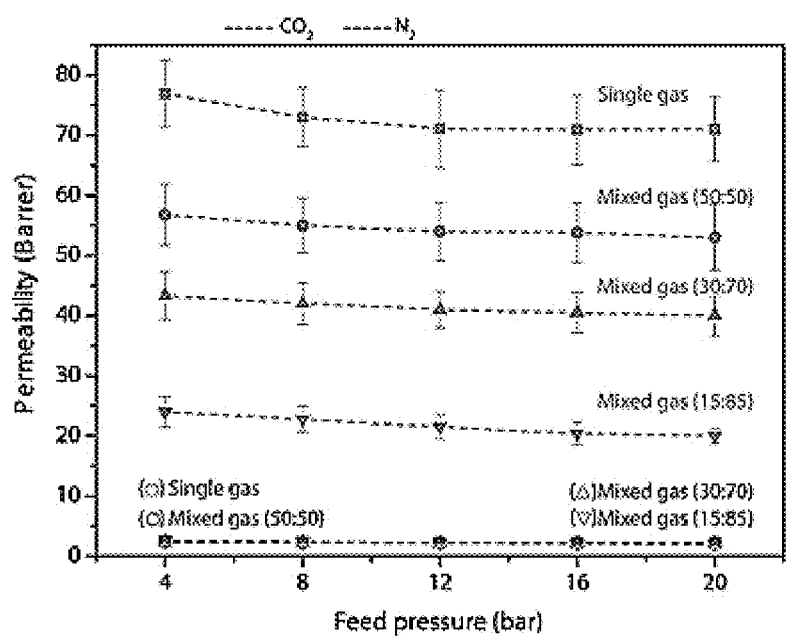
FIG. 13A illustrates pure gas and mixed gas permeability of $CO_2$, $N_2$ and $CH_4$ of XPU-HDA membrane as a function of feed pressure at 35° C. for three different $CO_2/N_2$ composition (50/50, 70/30, 10/90 vol. %), consistent with one or more exemplary embodiments of the present disclosure.
Figure 13B:
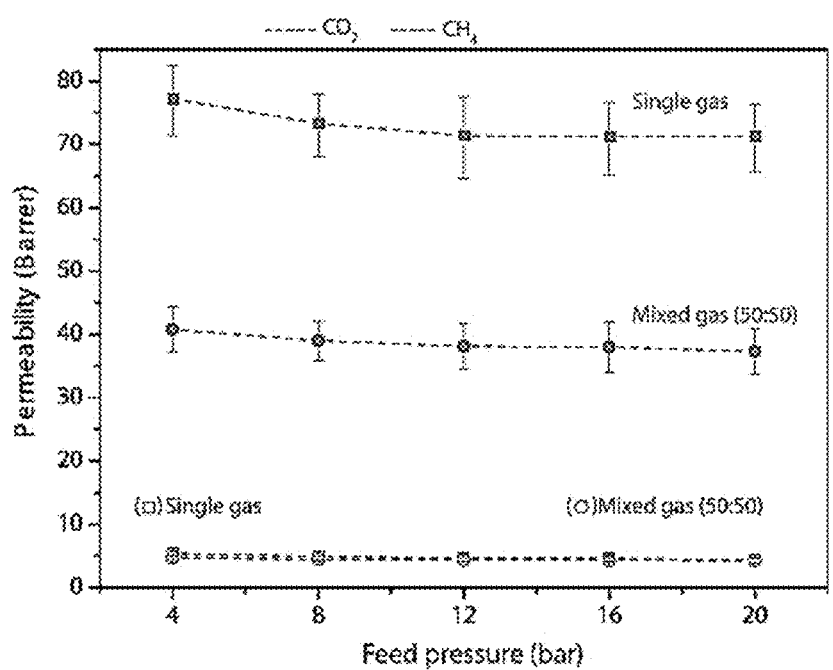
FIG. 13B illustrates pure gas and mixed gas permeability of $CO_2$, $N_2$ and $CH_4$ of XPU-HDA membrane as a function of feed pressure at 35° C. for $CO_2/CH_4$ (50/50 vol. %), consistent with one or more exemplary embodiments of the present disclosure.

FIG. 13A illustrates pure gas and mixed gas permeability of $CO_2$, $N_2$ and $CH_4$ of XPU-HDA membrane as a function of feed pressure at 35° C. for three different $CO_2/N_2$ compositions of 50/50, 70/30, 10/90 vol. %, consistent with one or more exemplary embodiments of the present disclosure. FIG. 13B illustrates pure gas and mixed gas permeability of $CO_2$, $N_2$ and $CH_4$ of XPU-HDA membrane as a function of feed pressure at 35° C. for $CO_2/CH_4$ (50/50 vol. %), consistent with one or more exemplary embodiments of the present disclosure. As shown in FIGS. 13A-13B, lower gas separation performance of the membrane in the mixed gas measurements compared to the single gas data is not only limited to the smaller separation factors but also lower permeabilities. For example, $CO_2$ mixed gas permeability decreases compared to the pure gas experiments. The reduction in $CO_2$ mixed gas permeability is greater at lower $CO_2$ feed gas concentrations. The $CO_2$ mixed gas permeability in $CO_2/CH_4$ gas mixtures (50/50 weight percent) is lower than that of $CO_2/N_2$ (50/50 weight percent) mixed gas systems. In an exemplary embodiment, $CO_2$ solubility decreases more due to the competitive sorption of $CH_4$.

Thermal stability, elastic modulus (E) and hardness (H) of PU and cross-linked PUs (XPUs) are reported in TABLE 1, consistent with one or more exemplary embodiments of the present disclosure. Thermal stability is important toward the applicability of membranes as PUs are generally susceptible to heat. Thermogravimetric analysis (TGA) measurements were conducted to evaluate the thermal stability of the pristine PU and XPU membranes. The XPUs undergo degradation initiation at lower temperatures whilst record great thermal stability improvements up to 100° C. at $T_{50\%}$. $T_{50\%}$ is the temperature where the material degraded by 50% and is reported in TABLE 1. Cross-linking results in a reduced degradation rate in the temperature range of 350-550 associated with the degradation of PUs. Cross-linked PUs have a higher residue content than the pristine PU. In an exemplary embodiment, the new covalent bonds within the hard segments increase the molecular interactions and hence the energy required to decompose the XPUs membranes. In an exemplary embodiment, the cross-linked hard segments stabilize the degradation process. As shown in TABLE 1, XPU-ODA shows the highest thermal stability which may be explained by higher cross-linking density.

Mechanical stability is crucial for applicability of the membranes under realistic industrial conditions. The modulus and hardness data were determined by assuming an isotropic response within indentation load displacement. Overall enhancement of around 600% and 200%, respectively in the modulus and the hardness of XPU-ODA compared to the pristine PU indicates a significant improvement in the stiffness for XPUs. The improved mechanical properties of the XPUs may be related to both strong interactions between the hard segments and higher phase separation.

TABLE 1

Thermal stability, Young's modulus and hardness of pristine PU and XPUs.

| Sample | $T_{50\%}$ (° C.) | Young's modulus (MPa) | Hardness (KPa) |
| --- | --- | --- | --- |
| Pristine PU | 357 | 200 | 15 |
| XPU-BDO | 399 | 580 | 28 |
| XPU-HAD | 441 | 1080 | 32 |
| XPU-ODA | 455 | 1350 | 42 |

What is claimed:

1. A method for fabricating a plasticization-resistant polyurethane membrane, the method comprising the steps of:
   synthesizing a polyurethane pre-polymer;
   synthesizing a polyurethane polymer, the polyurethane polymer comprising carboxylic acid groups from the synthesized polyurethane pre-polymer;
   obtaining an acyl chloride polyurethane polymer by functionalizing the synthesized polyurethane polymer; and preparing a plasticization-resistant polyurethane membrane by simultaneously cross-linking and casting the acyl chloride polyurethane polymer.

2. The method of claim 1, wherein synthesizing the polyurethane pre-polymer comprising:
preparing a mixture of a diisocyanate and a polyol compound by adding the diisocyanate to the polyol compound,
wherein the polyol compound comprises a block copolymer of the following formulas (I) and (II):
$PEG_a$-$PPG_b$-$PEG_a$ (I)
$PPG_b$-$PEG_a$-$PPG_b$
where a and b comprise an integer from 3 to 50;
fabricating a micro diisocyanate by adding a catalytic compound to the mixture of the diisocyanate and the polyol compound,
wherein the catalytic compound comprises of at least one zinc-based or amine-based catalyst including stannous 2-ethylhexanoate, stannous octanoat, dibutyltin 2-ethylhexanoate, dibutyltin diacetate, dioctyltin dimercaptide, N,N-dimethylalkylamines, N-alkylpyrrolidines, bis (dimethylaminopropyl) amine, 1,8-Diazabicyclo-5, 4,0-undecene-7, 2-Methyl-2-azanorbornane dibutyltin dilaurate (DBTDL), and mixture thereof; and
forming a polyurethane pre-polymer by aging the micro diisocyanate.

3. The method of claim 1, wherein synthesizing the polyurethane polymer comprises synthesizing the polyurethane polymer with an average molecular weight of at least 40000 by adding a chain extender to the polyurethane pre-polymer, the chain extender comprises a diol and a diamine, wherein the diol comprises at least one of 1,4-butanediol (BDO), 1,6-hexanediol (HDO), 1,8-octanediol (ODO), 3,5-diaminobenzoic acid (DABA), pentiptycene, and mixtures thereof;
wherein the diamine comprises at least one of 1,6-hexanediamine (HDA), 1,8-diaminooctane (ODA), 3,5-diaminobenzoic acid (DABA), pentiptycene, and mixtures thereof.

4. The method of claim 1, wherein obtaining the acyl chloride polyurethane polymer by functionalizing the synthesized polyurethane polymer comprising:
preparing a first solution by dissolving the synthesized polyurethane polymer in a solvent, the solvent comprising of one or more of tetrahydrofuran (THF), N-methylpyrrolidone (NMP), N,N-dimethyl acetamide (DMAC), acetone, N,N-dimethylformamide (DMF), dimethyl sulfoxide (DMSO), 1,3-dioxolane, ethanol, n-butanol, isopropyl, toluene, and chloroform;
preparing a second solution by adding a thionyl chloride to the first solution; and
obtaining an acyl chloride polyurethane polymer by distilling out excess amounts of solvent and thionyl chloride from the second solution.

5. The method of claim 1, wherein preparing a plasticization-resistant polyurethane membrane by crosslinking and casting of the polyurethane polymer comprising:
preparing a first solution by dissolving the acyl chloride polyurethane polymer in anhydrous N-Methyl-2-pyrrolidone (NMP);
preparing a second_solution by adding a cross-linking agent to the third solution; and
obtaining a cross-linked polyurethane membrane by casting a layer of the fourth solution on a substrate, the substrate includes a fabric substrate, a clean glass plate, Teflon petri-dish or a relatively porous membrane support,
wherein the obtained cross-linked polyurethane membrane is a plasticization-resistant polyurethane membrane.

6. The method of claim 5, wherein the cross-linking agent comprises one or more of 1,4-butanediol (BDO), 1,6-hexanediol (HDO), 1,6-hexanediamine (HDA), 1,8-octanediol (ODO), and 1,8-diaminooctane (ODA).

* * * * *